United States Patent Office 3,278,699
Patented Oct. 11, 1966

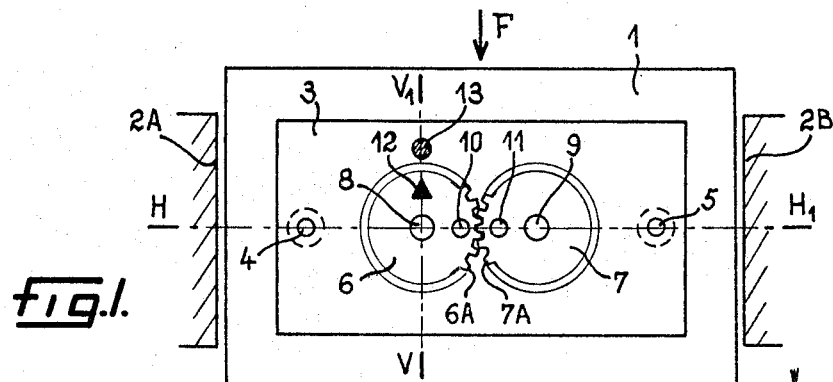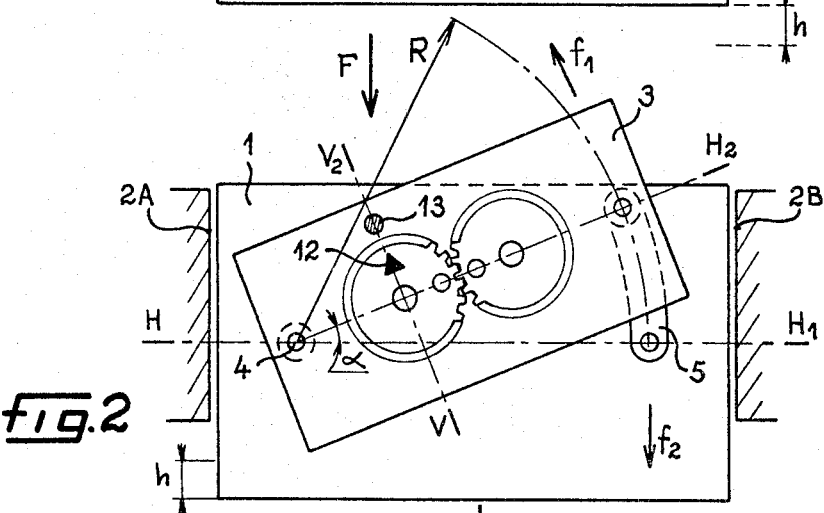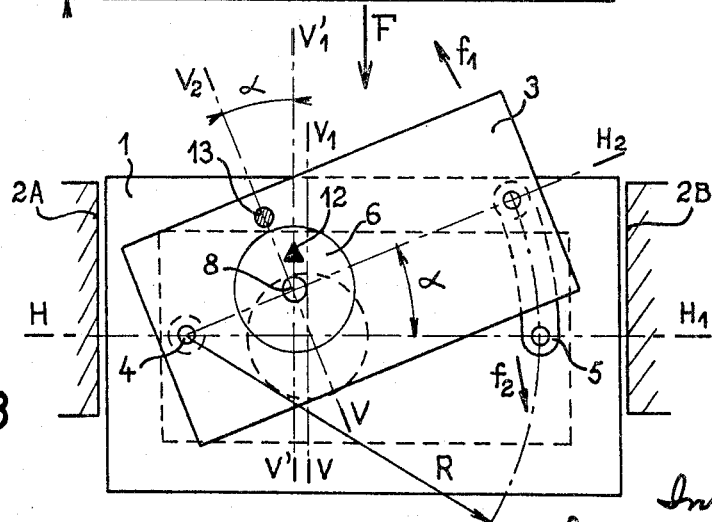

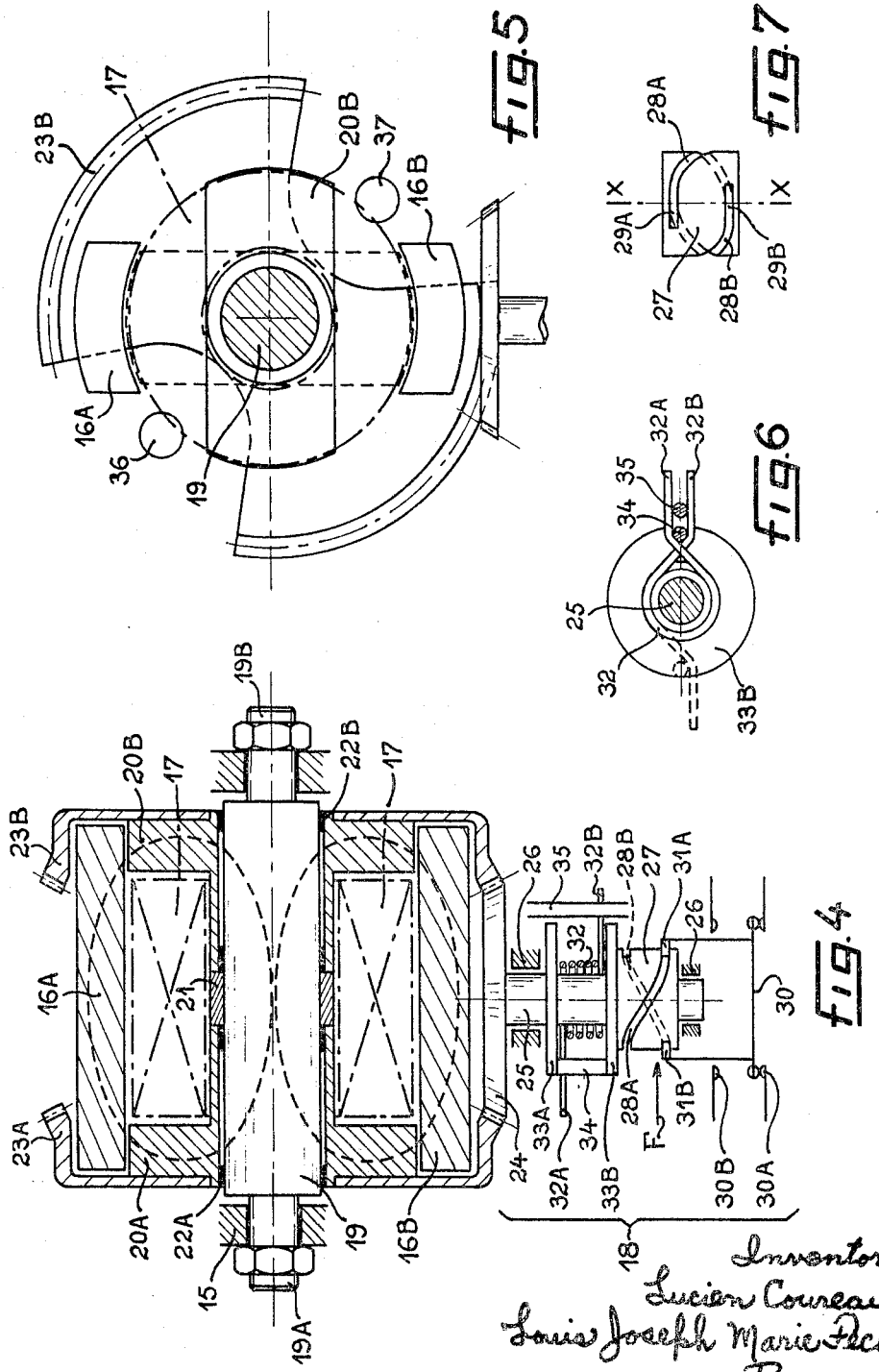

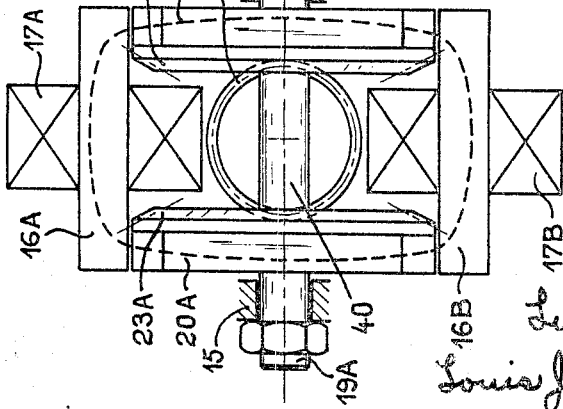

3,278,699
DEVICE FOR RENDERING CONTROL OR OPERATING APPARATUS UNAFFECTED BY ACCELERATIONS
Lucien Coureau, Paris, and Louis Joseph Marie Féchant, Le Vesinet, France, assignors to La Telemecanique Electrique, Nanterre, Seine, France, a French joint-stock company
Filed May 3, 1965, Ser. No. 452,552
Claims priority, application France, May 8, 1964, 973,853
8 Claims. (Cl. 200—61.46)

The present invention relates to a mechanical device which, when it is rigidly fixed to the moving part of an operating or control apparatus, renders the latter insensitive to external accelerations such as for example large shocks or vibrations, to which the apparatus may be subjected.

The invention is applied in a particularly advantageous manner to electro-magnetic relays or contactors in that it makes it possible to render their armatures and the contacts associated therewith insensitive to shocks. However, the invention is equally applicable to all apparatus, even non-electrical, such as regulators actuated by fluids or measuring instruments.

In the known state of the art, statically balanced systems have been tried which however are capable of displacement at the moment of the shocks in the direction of the forces applied and because of the inertia couples.

There are also employed, especially on contactors, bolts actuated by weight heads which are set into movement by the effect of the accelerations received. With certain contactors, interlocks are used, actuated by the leakage flux obtained from magnetic cores. All these devices are uncertain in operation due to the fact that the locking does not always act at the correct moment; there may be even produced an untimely locking due to the coincidence of a shock with the establishment of the current in the coil.

There has also been proposed a system with two rotating weights such that either of them can block the controlled apparatus. However, no account was taken in this system of the action of the stops, which may impart a certain acceleration to the moving parts, and these moving parts were not balanced so as to cause the axis of rotation to pass through the centre of gravity.

The device in accordance with the invention overcomes the drawbacks of the systems known at the present time, and enables the moving part of a control or operating apparatus to which it is attached to be rendered completely insensitive to external accelerations to which the said apparatus may be subjected.

The device in accordance with the invention is essentially characterized by the fact that the mechanism which is associated with the moving part of the apparatus which it is desired to make insensitive to external accelerations is composed of two statically balanced rotors, the axes of rotation of which are parallel, the said rotors being associated so as to rotate in opposite directions one to the other, without slip, and having respective pitch-circle radii, the ratio of which is equal to that of the moments of inertia of the corresponding rotors.

In accordance with one form of embodiment, the two rotors are identical, mounted on the same axis in two parallel planes and associated by at least one return gear-wheel.

In the case of application of the invention to an electro-magnetic relay or contactor, there is employed an armature of two identical magnetic, parallel rotors mounted on the same axis are associated by at least one return pinion, the shaft of which actuates, through the intermediary of a cam system, a set of contacts, while the portions of the armature, subjected to the opposing force a spring, are centered in the magnetic field of the core.

In accordance with an alternative form of construction a coupling of the two rotors could also be constructed without gearing, for example by means of cranks capable of pivoting about a fixed point and of reversing the movement.

According to a further alternative form of construction, the movement of the cam system which actuates the contacts is associated with the rotation of one of the two rotors.

The cam which transmits movements to the contacts comprises for each contact two fractions of travel concentric with its axis of rotation, these two fractions corresponding to the two active positions of the contacts in order, that, on the one hand, a slight uncertainty of the angular position of the rotors has no action on the contacts, especially if play is present in the mechanism, and on the other hand, so that any impact under shock of the contact system on the cam gives rise to zero moments of rotation on this latter.

As will be seen later for the particular case in which this cam rotates through 180°, only two concentric parts will be required for the whole contact system, working and rest.

Other characteristic features, advantages and particular aspects of the present invention will be brought out in the description which follows below, reference being made to the accompanying drawings, in which:

FIGS. 1 and 2 represent, before and during a shock, a diagrammatic view of an experimental shock testing arrangement for a mechanism which incorporates the principle of the invention, this test unit having been employed by the applicants during proving tests;

FIG. 3 shows the diagram of an experimental shock testing arrangement for a statically balanced rotor, this arrangement having been used by the applicants during the course of comparative tests identical with those of the first arrangement;

FIG. 4 shows very diagrammatically a view in cross-section elevation of a possible form of construction of a contractor with an axial core and with a single axial coil, which incorporates the present invention, the contractor being shown in the working position;

FIG. 5 shows an end view of the apparatus of FIG. 4, the front pinion and also the operating device for the contacts not being shown for the sake of clearness of the drawing, and the moving part of the contactor being in this case in the rest position;

FIG. 6 is a detail view representing in plan cross-section, the restoring and elastic abutment system of the moving part of the contactor;

FIG. 7 is a detail view showing the cam which operates the contacts, looking in the direction of the arrow F of FIG. 4;

FIG. 8 shows very diagrammatically a view in elevation cross-section of an alternative from of construction of a contactor with two cores and with symmetrical windings parallel to the axis, embodying the present invention, this form of construction being more particularly adapted for operation with alternating current;

FIG. 9 shows an end view of the apparatus illustrated in FIG. 8;

FIG. 10 is a detail view showing in elevation the operating device for the moving contacts of the apparatus, in the particular case, given as an example, in which the cam carries out half a turn.

For their experimental tests, the applicants have employed an arrangement, the principle of which has been shown diagrammatically in FIGS. 1 and 2.

A table 1 arranged vertically between two fixed lateral slides 2A, 2B, can be subjected to a very large acceleration, shown symbolically by the arrow F, at an appropriate height $h$. A plate 3 plays the part of the frame of an operating or control apparatus, the moving mechanism of which is to be made insensitive to external accelerations, such as for example shocks or substantial vibrations.

The said plate 3 is mounted so as to be able to oscillate at one of its extremities about a pivotal shaft 4 fixed on the table 1. The other extremity of the plate 3 is coupled to the table 1 by means of an elastic coupling 5, this latter being located, in the initial position of rest, on a level with the pivotal shaft 4 and forming therewith a horizontal reference level $H-H_1$.

It can immediately be seen that when there is applied to the table 1 a strong acceleration F which causes it to pass from the position of FIG. 1 to the position of FIG. 2, the plate 3, under the effect of the acceleration, pivots abruptly by inertia about the shaft 4 in the direction of the arrow $f_1$, by virtue of the elasticity of the coupling 5, and passes into the extreme position $H-H_2$, and then pivots in the direction of the arrow $f_2$, and so on in a succession of oscillations of decreasing amplitudes about the initial position of equilibrium $H-H_1$.

In other words, it can be seen that the table 1, while being subjected to a lateral acceleration F, transmits to the plate 3 and in consequence to any moving part mounted on it, an acceleration of rotation because of the ability of the elastic coupling 5 to describe a circle having a centre at 4 and a radius R.

In accordance with the invention, the mechanism coupled to the moving part of an apparatus, such as for example the moving system and the contacts of an electric relay, the pointers of indicating apparatus subject to vibrations, etc., is composed of two rotors 6 and 7 having their axes of rotation 8 and 9 parallel and located on the reference line $H-H_1$, those rotors being freely mounted on their shafts and being provided at their periphery with teeth 6A and 7A engaging with each other, so that, if one of the rotors turns in one direction, the other is forced to rotate in the opposite direction.

In the arrangement employed during the course of tests, the two rotors were identical (same weights, same moments of inertia and their teeth having the same radius).

On the other hand, the rotors 6 and 7 were provided with reference marks 10 and 11 which, in the initial position, are located on the reference line $H-H_1$, one facing the other as shown in FIGS. 1 and 2, these reference points having the object of indicating any relative movement taking place between the rotors 6 and 7.

In addition, one of the two rotors, in the present case the rotor 6, is provided with a second reference mark 12 arranged, in the initial position, opposite a reference mark 13 provided on the plate 3.

The two reference marks 12 and 13 have the object of showing any relative movement occurring between the rotor 6 and the plate 3, which can be detected by recording with a rapid cinema-camera.

Finally, it should be noted that the two rotors 6 and 7 are each balanced from the static point of view around their respective axes of rotation.

In order to obtain comparative results with an already known system, the applicants have used, under the same conditions as described above with reference to FIGS. 1 and 2, an arrangement identical with the single exception that it comprised only a single rotor 6, balanced statically about its axis of rotation 8. In order to avoid useless complication of the present description, the arrangement of FIG. 3 will not be again described, and the same reference as those of FIGS. 1 and 2 have been employed in FIG. 3 to refer to the same parts. Furthermore, on this same figure, the initial position of the plate 3 has been shown in broken lines and one of the end positions of oscillation of the said plate is shown in full lines.

The shock tests to which the two arrangements have been subjected brought out quite clearly the following facts:

(1) In the arrangement with two rotors of FIGS. 1 and 2, the reference marks 10 and 11 on the one hand and 12 and 13 on the other remain constantly facing each other, in spite of the lateral and rotational accelerations to which they were subjected; to pass from the initial position $H-H_1$ to the extreme position $H-H_2$ as regards the reference marks 10 and 11; and from the position $V-V_1$ to the extreme position $V-V_2$ with respect to the reference marks 12 and 13, the respective initial and extreme directions forming between them an angle $\alpha$.

(2) In the arrangement with a single rotor of FIG. 3, on the contrary, the reference marks 12 and 13 which were located on the same line $V-V_1$ when the plate 3 occupied the initial position of equilibrium $H-H_1$, were displaced with respect to each other by an angle $\alpha$, when the plate 3 reached its extreme position $H-H_2$ at which the reference mark 13 was located on a line $V-V_2$ and the reference mark 12 on a line $V'-V'_1$, parallel to $V-V_1$ and forming an angle $\alpha$ with $V-V_2$.

It results from these tests that only the system with two rotors according to the invention, provides a solution of th problem, whereas the system with a single rotor, a priori of the same nature, does not enable the said problem to be solved in any manner.

This is due to the fact that when a mechanical system capable of oscillating about a point, in the present case the system with two rotors according to the invention, or the known system with one rotor, is subjected to a force, the action of this force can be split-up into a force applied at the centre of gravity of this system and a couple.

The result of this is that in the system with a single rotor statically balanced, during the course of the test the rotor remains fixed in rotation in space while its support 3 rotates through an angle $\alpha$, which results in a relative movement between the two parts.

In the system with two rotors associated in accordance with the invention, on the contrary, the inertia couples of the two rotors being equal and of opposite signs cancel out at each instant at the point of engagement of the teeth 6A and 7A, with the result that, during the course of the test, no relative movement took place between the rotating parts 6 and 7 and the support 3.

It is quite obvious that the two rotors associated so as to rotate in opposite directions to each other without slip may not be identical; it is necessary and sufficient that the ratio between the radii of the pitch circles of the two rotors is then equal to the ratio between the moments of inertia of the two corresponding rotors.

Similarly, without departing from the scope of the invention, two identical rotors can be utilized and mounted, not on two parallel axes but on a single axis, these rotors then being located in two parallel planes and being associated so as to rotate in opposite directions one to the other by at least one reversing pinion.

This reversing pinion must be as light as possible in order to limit its own inertia of rotation to the maximum possible extent, or better still it should be balanced by an identical auxiliary pinion mounted symmetrically, and thus also rotating in the opposite direction to the first reversing pinion, thus obtaining complete symmetry and strictly annulling all rotational inertia along the two axes, namely that of the two rotors and that of the two reversing pinions.

On the other hand, it should be noted that it is necessary, in order to obtain a perfect result, to balance statically all the rotating parts so as to prevent the lateral accelerations, irrespective of their direction, imparted to the whole of the system from giving rise to differences of inertia.

There will now be described, purely by way of explanation and not in any limitative sense, two possible forms of construction of electro-magnetic contactors which incorporate the principle of the invention and which are in consequence rendered totally insensitive to external accelerations due to substantial shocks or vibrations.

In accordance with a first form of embodiment shown in FIGS. 4, 5, 6 and 7, the assembly is essentially constituted:

(1) By a fixed unit comprising: the frame proper of the apparatus having the reference 15, a yoke with two poles 16A and 16B, an axial coil 17 and a contact-operating unit designated by the general reference 18, and to which reference will be made in detail later.

(2) By a moving unit comprising: a fixed central core 19 made of a magnetic material, which is coaxial with the coil 17 and with the yoke 16A, 16B, the said core 19 being fixed by studs 19A, 19B in the frame 15; two rotors each constituted by a magnetic element 20A, 20B which are freely mounted on the core 19, symmetrically with respect to a central non-magnetic spacing member 21, these two elements comprising in their bore, non-magnetic friction rings 22A, 22B which form annular air-gaps, the path of the magnetic flux being indicated diagrammatically by two broken lines; two toothed pinions 23A and 23B made of a non-magnetic material and respectively keyed on the two elements 20A and 20B which pinions 23A and 23B with elements 20A and 20B together constitute the rotor of the armature of the electromagnetic contactor when in conjunction with at least one reversing pinion 24 engaging with the pinions 23A and 23B, the shaft 25 of which is mounted in a bearing 26 fixed to the frame 15, it being understood, as has previously been stated, that this reversing pinion may be duplicated by a second pinion mounted symmetrically for the purpose of perfecting the balance of the parts in rotation. It can be seen that in this construction, the rotors rotate at most through a quarter of a turn and the pinion 24 through half a turn.

In the form of embodiment shown by way of example, the actuating system 18 of the contacts is operated by the shaft 25 of the reversing pinion 24, it being understood that the said system could equally well be actuated by one of the two rotors 20A, 20B, the only condition being that both in the position of opening and in the position of closure of the contacts, the mass of the whole of the system only gives rise to reactions which pass through the axis of the said system.

In accordance with a form of construction which is particularly simple but obviously not limitative, the actuating system 18 is constituted by a cylinder 27, in the surface of which (see FIGS. 6 and 7) are formed two symmetrical helicoidal ramps 28A and 28B comprising extremities such as 29A and 29B in FIG. 7, which are at right angles to the axis of rotation X–X₁ of the cylinder 27 and providing zones for the rest position 30A and working position 30B of the contacts 30, these zones permitting a slight rotation of the moving unit without actuation of the contacts 30, as has been previously explained. These contacts 30 are actuated by the cam 27 by means of rollers 31A and 31B, which are driven by the helicoidal ramps 28A and 28B and are rigidly fixed to the said contacts 30.

It is of course understood that for the reasons given during the description of the principle of the invention, the symmetrical elements of the moving system have identically the same inertia, since their coupling ratio is 1.

In accordance with a further characteristic feature of the invention, the position under tension, that is to say the working position of the contactor shown in FIG. 4, is ensured by the centering of the armature of which the half elements 20A and 20B of the rotor with which the pinions 23A and 23B are fixed in the magnetic flux, while the off-voltage position, that is to say the position of rest of the contactor shown in FIG. 5 is ensured by a restoring spring 32 forming an elastic fork abutment.

To this end, the said spring 32 is wound round the shaft 25 of the bevel pinion 24, between two plate 33A and 33B rigidly fixed to the said shaft and coupled together by a spacer 34, so that the two extremities 32A and 32B of the spring 32 are crossed and bear, in the position of rest (see FIG. 6), on each side of the member 34 on the one hand and of a fixed outer rod 35 on the other. The extremity 32A of the spring 32 occupies the position shown in broken lines in FIG. 6 in the working position of the contactor, while the other extremity 32B of the spring continues to bear against the fixed rod 35.

Rigid over-travel stops such as the stops 36 and 37 in FIG. 5, are provided to prevent accidental passage of the armature, for example by a manual action, out of the zone of operation, irrespective of whether it is subjected or not to external accelerations, since such an accidental passage could cause damage to the mechanical parts of the system.

In order not to complicate the description, the reasons for which the apparatus is made insensitive to external accelerations will not be detailed again, since these reasons are strictly the same as those detailed during the course of the description of the diagrams of the principle of the invention in FIGS. 1 and 2.

There will now be briefly described with reference to FIGS. 8, 9 and 10 a further possible form of construction of a contactor in accordance with the invention, this form of construction being more particularly adapted for operation on alternating current.

In this alternative form of construction, the two rotor half-elements 20A and 20B of the armature, on which are respectively mounted the two rotor elements 23A and 23B, are freely mounted on a single shaft 40, the extremities 19A and 19B of which are fixed to the frame 15.

In this case, the flux is supplied by two coils 17A and 17B symmetrical with the shaft 40 and mounted on the two fixed yokes 16A and 16B forming cores, the flux being closed as indicated by the broken line through the rotors.

It is immediately apparent that the shape of this contactor is more suitable than that of the first form of embodiment for a construction with laminated steel sheets for alternating currents.

It is quite clear that, as in the first form of embodiment, the movement for operating the contracts 30 can be taken from the shaft 25 of the bevel pinion 24 and it could also be taken from the shaft 40 coupled to the rotation of one of the two rotors 20A and 20B of the armature. Similarly, a second bevel or reversing pinion could be arranged between the pinions 23A and 23B, symmetrically with respect to the first pinion 23, in order to obtain a perfectly symmetrical unit.

The device for actuating the contacts is provided with a restoring system having an elastic abutment 32–33A–33B–34–35, identical with that described in the first form of embodiment.

Over-travel stops such as the stops 36 and 37 are provided with an exceptional function of mechanical safety, as has already been explained.

As has previously been seen, the actuating control of the contacts 30 is provided in order that the contacts operated are not in any way influenced by small reactions of the parts concerned.

Instead of the cylindrical cam with helicoidal ramps of the first form of embodiment, it is also quite possible to adopt the form of cam shown at 41 in FIG. 10, which comprises at 41A and 41B, parts concentric with the shaft 25 and determining zones for the rest and working positions of the contactor, at which a slight rotation of the shaft can take place without operating the contacts 30. These contacts are coupled to the cam by means of a fork 42 provided with rollers 41A and 41B at its extremities.

The operation of the apparatus described above is similar to that of the first form of embodiment. Similarly, this apparatus according to the present invention is rendered completely insensitive to external accelerations such as for example substantial shocks or vibrations, to which it may be subjected.

It will of course be understood that the present invention has been described and illustrated purely by way of explanation only and not in any limitative sense, and that modifications of detail may be made thereto without departing from the scope of the said invention.

Furthermore, as has already been mentioned, it is quite obvious that while the invention is applicable in a particularly advantageous manner to electro-magnetic relays or contactors, it is equally applicable to all operating or control apparatus comprising a moving part which it is desired to make insensitive to substantial external accelerations to which the said apparatus may be subjected, such as for example regulators actuated by fluids, or measuring instruments.

We claim:

1. The moving portion of apparatus wherein the moving portion is rendered insensitive to external accelerations to which said apparatus may be subjected comprising
    a shaft fixed to the apparatus,
    two identical rotors coaxially mounted on said shaft and located in parallel planes on said shaft constituting a coaxially statically balanced rotating member,
    at least one bevel-gear pinion coupling said two identical rotors so as to compel their rotation in opposite directions to each other without slipping,
    a set of moving contacts actuated by movement of said rotors,
    means connected to at least one of said rotors to said set of contacts to transmit movement of said rotors to said set of contacts,
    and elastic restoring means for the rotors connected to said rotors.

2. The moving portion of apparatus as claimed in claim 1 wherein
    said means to transmit movement of said rotors to said set of contacts includes a cam means positioned to actuate said set of moving contacts.

3. Apparatus wherein the moving portion is rendered insensitive to external accelerations to which said apparatus may be subjected comprising
    an electro-magnetic contactor having a frame, a moving armature, and a set of contacts having at least one moving contact,
    said armature including
        a shaft fixed to said frame,
        two identical rotors of magnetic material coaxially mounted on said shaft and located in parallel planes on said shaft,
        two identical rotors of a non-magnetic material each respectively and rigidly fixed to one of said two rotors of magnetic material constituting therewith a coaxially balanced rotating member,
    at least one bevel-gear pinion coupling said two non-magnetic rotors so as to compel their rotation in opposite directions to each other without slipping,
    means connected to at least one of said rotors to transmit movement of said rotors to said set of contacts,
    and elastic restoring means for said armature connected to said armature, 4. The apparatus of claim 3 wherein
    said means to transmit movement of said rotors to said set of contacts includes a cam means positioned to actuate said set of moving contacts.

5. Apparatus wherein the moving portion is rendered insensitive to external accelerations to which said apparatus may be subjected comprising
    an electro-magnetic contactor having a frame, a moving armature, and a set of contacts having at least one moving contact,
    said armature including
        a shaft fixed to said frame,
        two identical rotors of magnetic material coaxially mounted on said shaft and located in parallel planes on said shaft,
        two identical rotors of a non-magnetic material each respectively and rigidly fixed to one of said two rotors of magnetic material constituting therewith a coaxially balanced rotating member,
    at least one bevel-gear pinion having a shaft and coupling said two non-magnetic rotors so as to compel their rotation in opposite directions to each other without slipping,
    cam means fixed on said shaft of said bevel-gear pinion for transmitting the movement of said armature to said set of contacts.

6. The apparatus of claim 5 further characterized by said cam means having at least a fraction of its travel concentric with its axis of rotation, the said fraction corresponding to the working position of said moving contact,
    whereby no reaction is transmitted to said contact along the course of said fraction.

7. The apparatus of claim 6 further characterized by said set of contacts having at least two moving contacts, and said cam means is constituted by a cylinder comprising at least two symmetrical helicoidal grooves in which are located rollers for actuating said at least two corresponding moving contacts, said grooves constituting respective areas for the working and non-working positions of said contacts,
    whereby in said areas the small motions of said armature and consequently of said cam are not transmitted to said corresponding contacts.

8. The apparatus of claim 6 wherein
    said cam means comprises respectively working and non-working areas for the said at least one moving contact of said contactor, and in which said at least one moving contact is coupled to said cam means by means of a fork carrying rollers at its extremities.

References Cited by the Examiner

UNITED STATES PATENTS

| | | | |
|---|---|---|---|
| 1,585,318 | 5/1926 | Tupper | 200—87 |
| 2,706,401 | 4/1955 | Spaulding | 73—517 X |
| 2,959,057 | 11/1960 | Winker | 73—516 |
| 3,064,098 | 11/1962 | Nicolaus | 200—38 X |

FOREIGN PATENTS 1,060,073  11/1953  France.

BERNARD A. GILHEANY, *Primary Examiner.*

J. J. BAKER, *Assistant Examiner.*